(12) United States Patent
Borsboom et al.

(10) Patent No.: US 6,652,827 B1
(45) Date of Patent: Nov. 25, 2003

(54) PROCESS FOR THE RECOVERY OF SULPHUR FROM A HYDROGEN SULPHIDE, CONTAINING GAS

(75) Inventors: Johannes Borsboom, Rijswijk (NL); Petrus Franciscus M. T. van Nisselrooij, Nijmegen (NL)

(73) Assignee: Jacobs Nederland B.V., CB Leiden (NL)

( * ) Notice: Subject to any disclaimer, the term of this patent is extended or adjusted under 35 U.S.C. 154(b) by 0 days.

(21) Appl. No.: 09/763,561

(22) PCT Filed: Aug. 25, 1999

(86) PCT No.: PCT/NL99/00530
§ 371 (c)(1),
(2), (4) Date: May 1, 2001

(87) PCT Pub. No.: WO00/10693
PCT Pub. Date: Mar. 2, 2000

(30) Foreign Application Priority Data

Aug. 25, 1998 (EP) ............................................. 98202837

(51) Int. Cl.⁷ .............................................. C01B 17/04
(52) U.S. Cl. ................................ 423/573.1; 423/574.1; 423/576.8; 423/564
(58) Field of Search ........................... 423/230, 244.01, 423/244.06, 244.1, 564, 573.1, 574.1, 576.8

(56) References Cited

U.S. PATENT DOCUMENTS

| | | | |
|---|---|---|---|
| 4,725,417 A | * 2/1988 | Deschamps et al. | ........ 423/244 |
| 4,919,912 A | * 4/1990 | Taggart et al. | .......... 423/574 R |
| 4,988,494 A | 1/1991 | Lagas et al. | ............ 423/574 R |
| 6,214,311 B1 | * 4/2001 | Kwong | ........................ 423/570 |
| 2002/0094308 A1 | * 7/2002 | Portz | .......................... 422/171 |

FOREIGN PATENT DOCUMENTS

| WO | WO 94/11105 A | 5/1994 |
|---|---|---|
| WO | WO 97/17283 | 5/1997 |

OTHER PUBLICATIONS

Hattangadi "How to set a Periodic Table" *Industrial Chemist* vol. 9 No. 5, pp. 20–23, May 1988.*

* cited by examiner

*Primary Examiner*—Stanley S. Silverman
*Assistant Examiner*—Timothy C. Vanoy
(74) *Attorney, Agent, or Firm*—Weingarten, Schurgin, Gagnebin & Lebovici LLP

(57) ABSTRACT

The invention is directed to a process for the recovery of sulphur from a hydrogen sulphide containing gas, which process comprises; i) oxidizing part of the hydrogen sulphide in a gaseous stream with oxygen or an oxygen containing gas in an oxidation stage to sulphur dioxide; ii) reacting the product gas of this oxidation stage in at least two catalytic stages, in accordance with the Claus equation: $2 H_2S + SO_2 \rightarrow 2 H_2O + 3/n\ S_n$; iii) catalytically reducing $SO_2$ in the gas leaving the last of said at least two catalytic stages, wherein the catalytic reduction takes place in a catalyst bed downstream from the last Claus catalytic stage.

17 Claims, 4 Drawing Sheets

PROCESS FOR THE RECOVERY OF SULPHUR FROM A HYDROGEN SULPHIDE, CONTAINING GAS

BACKGROUND OF THE INVENTION

In a number of processes, such as the refining of crude oil, the purification of natural gas and the production of synthesis gas from, for example, fossil fuels, sulphur containing gas, in particular $H_2S$ containing gas, is released. On account of its high toxicity and its smell, the emission of $H_2S$ is not permissible.

The best known and most suitable process for removing sulphur from gas by recovering sulphur from hydrogen sulphide is the so-called Claus process. In this process hydrogen sulphide is converted by oxidation to a considerable extent into elemental sulphur; the sulphur thus obtained is separated from the gas by condensation. The residual gas stream (the so-called Claus residual gas) still contains some $H_2S$ and $SO_2$.

The method of recovering sulphur from sulphur containing gases by the so-called Claus process is based on the following overall reactions:

$$2\ H_2S + 3\ O_2 \rightarrow 2\ H_2O + 2\ SO_2 \quad (1)$$ 

$$4\ H_2S + 2\ SO_2 \rightleftharpoons 4\ H_2O + 6/n\ S_n \quad (2)$$ 

Reactions (1) and (2) result in the main reaction:

$$2\ H_2S + O_2 \rightleftharpoons 2\ H_2O + 2/n\ S_n \quad (3)$$ 

A conventional Claus converter—suitable for processing gases having an $H_2S$ content of between 50 and 100%, comprises a burner with a combustion chamber, the so-called thermal stage, followed by a number of reactors generally two or three—filled with a catalyst. These last stages constitute the so-called catalytic stages.

In the combustion chamber, the incoming gas stream, which is rich in $H_2S$, is combusted with an amount of air at a temperature of approximately 1200° C. The amount of air is adjusted so that one third of the $H_2S$ is fully combusted to form $SO_2$ in accordance with the following reaction:

$$2\ H_2S + 3\ O_2 \rightarrow 2\ H_2O + 2\ SO_2 \quad (1)$$ 

After this partial oxidation of $H_2S$ the non-oxidised part of the $H_2S$ (i.e. basically two-thirds of the amount offered) and the $SO_2$ formed react further as to a considerable portion, in accordance with the Claus reaction $$4\ H_2S + 2\ SO_2 \rightleftharpoons 4\ H_2O + 3\ S_2 \quad (2)$$ 

Thus, in the thermal stage, approximately 60% of the $H_2S$ is converted into elemental sulphur.

The gases coming from the combustion chamber are cooled to about 160° C. in a sulphur condenser, in which the sulphur formed is condensed, which subsequently flows into a sulphur pit through a siphon.

The non-condensed gases, in which the molar ratio of $H_2S:SO_2$ is unchanged and still 2:1, are subsequently heated to about 250° C., and passed through a first catalytic reactor in which the equilibrium $$4\ H_2S + 2\ SO_2 \rightleftharpoons 4\ H_2O + 6/n\ S_n \quad (2)$$ 

is established.

The gases coming from this catalytic reactor are subsequently cooled again in a sulphur condenser, in which the liquid sulphur formed is recovered and the remaining gases, after being re-heated, are passed to a second catalytic reactor.

When the gaseous feedstock contains $H_2S$ concentrations of between about 15 and 50%, the above described "straight through" process is not used, but instead a variant thereof, the so-called "split-flow" process. In the latter process one-third of the total amount of feedstock is passed to the thermal stage and combusted completely to $SO_2$ therein. Two-thirds of the feedstock is passed directly to the first catalytic reactor, by-passing the thermal stage. When the feedstock contains $H_2S$ concentrations of between 0 and 15 the Claus process can no longer be used. The process then used is, for example, the so-called Recycle SELECTOX process, in which the feedstock is passed with an adjusted amount of air into an oxidation reactor, the so-called oxidation reactor, the so-called oxidation stage. The reactor contains a catalyst which promotes the oxidation of $H_2S$ to $SO_2$, and the amount of oxidation air is adjusted so that an $H_2S:SO_2$ ratio of 2:1 is established, whereafter the Claus reaction proceeds. The gas from the oxidation reactor is cooled in a sulphur condenser, in which the sulphur formed is condensed and discharged.

To dissipate the reaction heat generated in the oxidation reactor, a portion of the gas stream coming from the sulphur condenser is recirculated to the oxidation reactor.

It is clear that in the Recycle SELECTOX process, the oxidation stage, which is catalytic and does not lead to high temperatures, is equivalent to the thermal stage in the Claus process. In the following, both the thermal Claus stage and the oxidation stage of the Recycle SELECTOX process are referred to as oxidation stages.

The sulphur recovery percentage in a conventional Claus converter is 92–97%, depending on the number of catalytic stages By known processes, the $H_2S$ present in the residual gas from the Claus reaction is converted, by combustion or some other form of oxidation, into $SO_2$ whereafter this $SO_2$ is emitted to the atmosphere. This has been permissible for low concentrations or small amounts of emitted $SO_2$ for a long time. Although $SO_2$ is much less harmful and dangerous than $H_2S$ this substance is also so harmful that its emission is also limited by ever stricter environmental legislation.

As has been observed, in the Claus process as described above, in view of the equilibrium reaction which occurs, the $H_2S:SO_2$ ratio plays an important role. In order to obtain an optimum conversion to sulphur, this ratio should be 2:1. Generally speaking, this ratio is controlled by means of a so-called $H_2S/SO_2$ residual gas analyser. This analyser measures the $H_2S$ and $SO_2$ concentrations in the residual gas. A controller then maintains the ratio of 2:1 constant on the basis of the equation $$[H_2S] - 2[SO_2] = 0$$

by varying the amount of combustion air, depending on the fluctuations in the gas composition and the resulting deviation in the above equation. Such a control of the process, however, is highly sensitive to these fluctuations.

Furthermore, the sulphur recovery efficiency (calculated on the amount of $H_2S$ supplied) is no higher than 97%, and so the gas flowing from the last catalytic stage the residual gas—still contains substantial amounts of $H_2S$ and $SO_2$, determined by the Claus equilibrium, and this in a molar ratio of 2:1.

The amount of $H_2S$ present in the residual gas can be separated by absorption in a liquid.

The presence of $SO_2$ in the residual gas, however, is a disturbing factor during the further processing thereof and must therefore be removed prior to such further processing. This removal and hence the after-treatment of the gas is complicated.

The great disadvantage of the presence of $SO_2$ is that this gas reacts with conventional liquid absorbents to form undesirable products. To prevent undesirable reactions of the $SO_2$, therefore, the $SO_2$ is generally catalytically reduced with hydrogen to form $H_2S$ over an $Al_2O_3$ supported cobalt-molybdenum catalyst in accordance with the so-called SCOT process. The total amount of $H_2S$ is subsequently separated by liquid absorption in the usual manner.

In the SCOT process the sulphur components, other than $H_2S$, such as $SO_2$ (sulphur dioxide) and sulphur vapour ($S_6$ and $S_8$) are fully hydrogenated to $H_2S$ according to the following reactions:

$$SO_2 + 3\ H_2 \rightarrow H_2S + 2\ H_2O \qquad (4)$$

$$S_6 + 6\ H_2 \rightarrow 6\ H_2S \qquad (5)$$

$$S_8 + 8\ H_2 \rightarrow 8\ H_2S \qquad (6)$$

Other components, such as CO, COS and $CS_2$, are hydrolysed according to:

$$COS + H_2O \rightarrow H_2S + CO_2 \qquad (7)$$

$$CS_2 + 2\ H_2O \rightarrow 2\ H_2S + CO_2 \qquad (8)$$

$$CO + H_2O \rightarrow H_2 + CO_2 \qquad (9)$$

Above conversions to $H_2S$ are performed with a cobalt-molybdenum catalyst on alumina at a temperature of about 280–330° C. For the SCOT process it is required that sulphur vapour is hydrogenated to $H_2S$, and also that $SO_2$ is completely converted to $H_2S$ down to ppm level, to prevent plugging/corrosion in the down-stream water quench column. This type of hydrogenation can be defined as high temperature hydrogenation.

In accordance with another method, for example, the BSR SELECTOX process, after reduction of the $SO_2$ in residual gas to $H_2S$ and after condensation of the water vapour, the gas is passed into an oxidation reactor, as in the Recycle SELECTOX process. The oxidation air is adjusted so that an $H_2S:SO_2$ ratio of 2:1 is obtained, whereafter the Claus reaction proceeds. Both in the SCOT process and in the BSR SELECTOX process, the removal of $SO_2$ from the residual gas is a relatively expensive operation.

The above described after-treatment of the gases, carried out by means of a so-called tail gas treater, which involves an investment of another 50–100% of the cost of the preceding Claus converter, can result in an increase of the sulphur recovery efficiency of up to 98–99.8%.

In U.S. Pat. No. 4,988,494, it is proposed that the $H_2S$ concentration in the gas leaving the last catalytic Claus stage is controlled to have a value ranging between 0.8 and 3% by volume by reducing the quantity of combustion or oxidation air passed to the oxidation stage.

The increase of the $H_2S$ concentration will result in a decreased $SO_2$ concentration, however, not to very low levels. For an $H_2S$ concentration of 0.8% by volume, the $SO_2$ concentration will be typically 0.03–0.15% by volume, and this will result in a sulphur recovery efficiency loss of typically 0.09–0.45%.

In the process according to this patent, the $H_2S$ is selectively oxidised in a dry bed oxidation stage.

As $SO_2$ is not converted in a dry-bed oxidation stage, this will result in appreciable sulphur recovery losses, and consequently sulphur recovery efficiencies close to 100% can not be reached.

A second disadvantage of operating with excess $H_2S$ compared to $SO_2$ is that the temperature increase in the drybed oxidation reactor becomes higher with increasing $H_2S$ concentration.

Higher reactor temperatures will result in an increased formation of $SO_2$ as a result of gas-phase and catalytic oxidation of formed sulphur vapour. Also for this reason, a shifted operation towards $H_2S$ of the Claus converter is not beneficial.

It has been experienced, that in case the catalyst bottom temperature in a dry-bed oxidation reactor exceeds 250–260° C., the oxidation efficiency to elemental sulphur will start to drop from 94–96% to lower values. Combined with a reactor inlet temperature of approximately 180–200° C., this results in a temperature increase of some 60–80° C., corresponding with 1.0–1.2 vol. % of $H_2S$ in the process gas.

The shifted operated sulphur plant, followed by a drybed oxidation step with an oxidation catalyst which is not effective in promoting the Claus reaction, is known as the SUPERCLAUS™ or SUPERCLAUS™-99 process.

The SUPERCLAUS™ process, as well as the SUPERCLAUS™-99.5 process, is described in -SUPERCLAUS™-the answer to Claus plant limitations", Lagas, J. A.; Borsboom, J; Berben, P. H., 38$^{th}$ Canadian Chemical Engineering Conference, Edmonton, Canada.

It is known, that removal of $SO_2$ from a process gas can be performed according to a high temperature hydrogenation step to $H_2S$ as applied in the SCOT process or in the SUPERCLAUS™-99.5 process.

In European patent No. 669,854 the selective hydrogenation of $SO_2$ to elemental sulphur has been described. It has been mentioned that this hydrogenation could suitably be applied downstream of a regular Claus unit, prior to dry bed oxidation.

However, the specific process conditions required according to this patent are not easily compatible with the composition of gas coming from a Claus unit. This means that rather complicated, and thus costly, measures are necessary to satisfy these conditions.

BRIEF DESCRIPTION OF THE INVENTION

Surprisingly it has now been found that it is possible to increase the sulphur recovery by very simple process modifications.

According to the invention a process for the recovery of sulphur from a hydrogen sulphide containing gas comprises:

i) oxidising part of the hydrogen sulphide in a gaseous stream with oxygen or an oxygen containing gas in an oxidation stage to sulphur dioxide;

ii) reacting the product gas of this oxidation stage in at least two catalytic stages, in accordance with the Claus equation $$2\ H_2S + SO_2 \rightarrow 2\ H_2O + 3/n\ S_n$$

iii) catalytically reducing $SO_2$ in the gas leaving the last of said at least two catalytic stages, wherein the catalytic reduction takes place in a catalyst bed downstream from the last Claus catalytic stage.

One aspect of the invention is the reduction of $SO_2$. This reduction of $SO_2$ to elemental sulphur, to $H_2S$ or to a mixture of both, by hydrogenation, requires the presence of hydrogen. In the gas leaving the last catalytic Claus stage sufficient hydrogen is normally present. This hydrogen is produced in the thermal stage, by, among others, cracking of $H_2S$ to hydrogen and sulphur vapour. In case the amount of hydrogen is insufficient, additional hydrogen may be added to the gas, by adding a stream of concentrated hydrogen, or by generating hydrogen by sub-stoichiometric combustion of fuel gas in in-line process heaters.

Also CO is usually present in the gas containing $SO_2$. Because of the reducing properties of CO, this component is capable of reducing $SO_2$. In this way CO acts in the same way as hydrogen, and a mixture of hydrogen and CO is therefor also suitable for reducing $SO_2$.

$$CO+H_2O \rightarrow CO_2+H_2$$

$$SO_2+2\ CO \rightarrow 2CO_2+1/n\ S_n$$

BRIEF DESCRIPTION OF THE FIGURES

Other features and advantages of the invention will be apparent from the following description of the preferred embodiments thereof and from the claims, taken in conjunction with the accompanying drawings, in which:

DETAILED DESCRIPTION OF THE INVENTION

Figure 1:
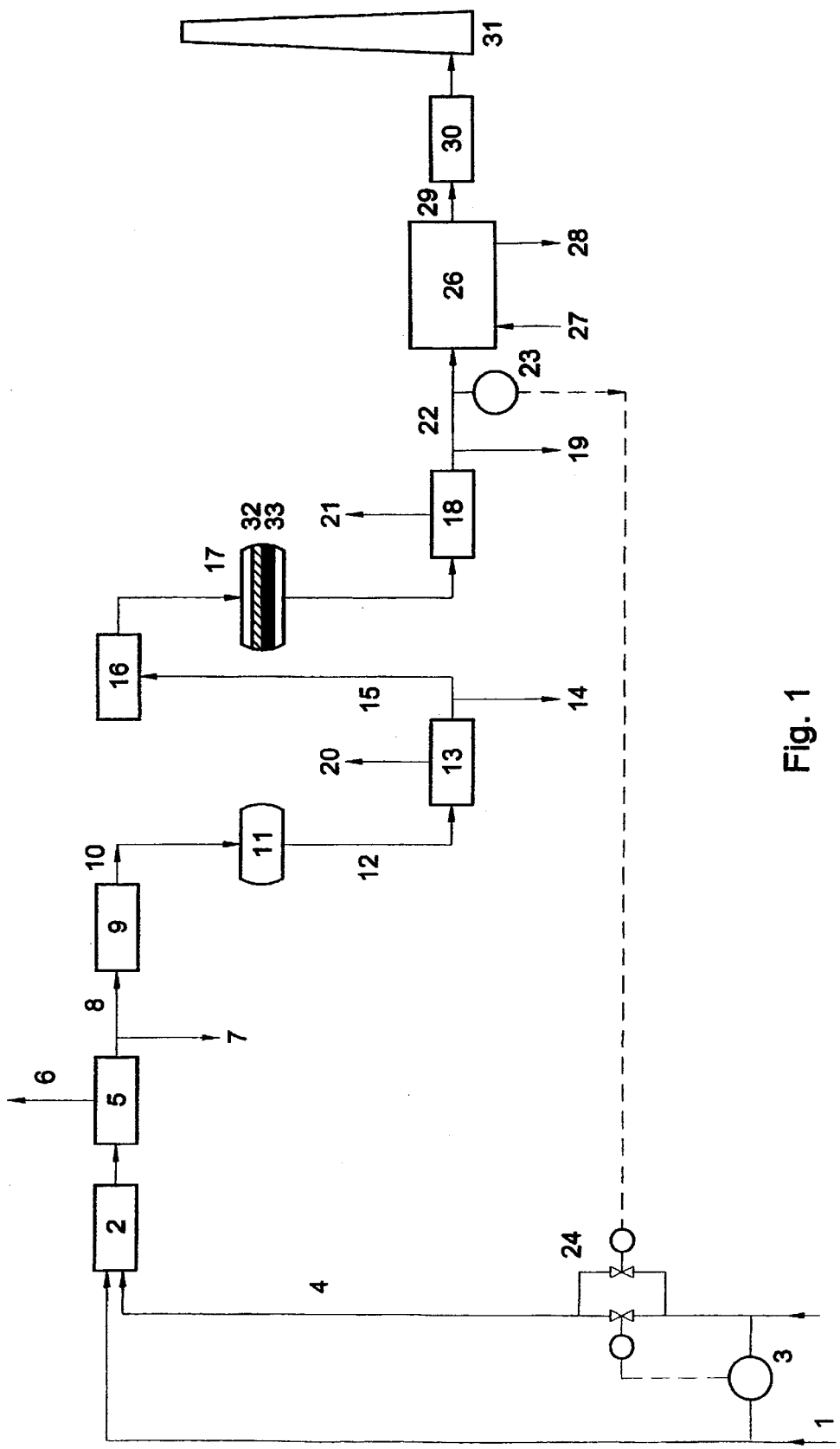
FIG. 1 is a schematic diagram of a feedstock Claus gas process according to the present invention.

In the context of this invention the terms 'reduction' and 'hydrogenation' have both been used to indicate the same.

It was found that reduction of $SO_2$ to $H_2S$ proceeds in two steps. The first step is the hydrogenation of $SO_2$ to elemental sulphur vapour, according to:

$$SO_2+2\ H_2 \rightarrow 1/n\ S_n+2\ H_2O \qquad (10)$$

The temperature range of this reaction is typically 130–230° C. Complete conversion of $SO_2$ is achieved at approximately 200–230° C. over a conventional cobalt-molybdenum-catalyst.

The hydrogenation of sulphur vapour to $H_2S$ starts at approximately 220° C., and is completed at approximately 260 300° C. All temperature levels depend also on space velocity, $H_2O$ and $SO_2$ concentration, $H_2/SO_2$ ratio and type of catalyst.

A suitable temperature range to convert $SO_2$ is typically above 200° C., whereas a suitable upper limit is 225° C. For an acceptable conversion of $SO_2$, the catalyst temperature should be high enough to stay above the sulphur vapour dewpoint. The presence of oxygen in the gas to be hydrogenated is not harmful to the catalyst or catalyst performance, as oxygen is hydrogenated to water under approximately the same reaction conditions as apply to $SO_2$.

The hydrogenation catalyst can be selected from the group of metals of group VI and VIII of the periodic table of elements. The catalyst may be supported and is preferably in the sulphidic form. Examples are iron, nickel and cobalt for Group VIII, and molybdenum, tungsten and chromium for Group VI. It is preferred to use cobalt-molybdenum or nickel-molybdenum.

In case the gas coming from the $SO_2$ hydrogenation step is not further subjected to a treatment, it has advantages to, adjust the molar ratio of $H_2S$ to $SO_2$ after the final Claus stage, to a value different from 2:1, i.e. a higher amount of $SO_2$, which results in a high sulphur recovery, with only very limited efforts. Generally it is preferred to have a ratio of from 1:1 to 1:10.

It should be noted, that complete conversion of all sulphur compounds to $H_2S$ down to the ppmv-level as in the SCOT process, is not required. Hydrogenation of $SO_2$ down to a level of approximately 100 ppmv is acceptable and will result in negligible recovery efficiency losses.

It is not very critical whether the reduction of $SO_2$ proceeds to elemental sulphur or to $H_2S$. Generally a mixture of both will be obtained, which has preference.

In the SUPERCLAUS™ process, as described in U.S. Pat. No. 4,988,494, a residual concentration of $SO_2$ is left in the process gas to the dry-bed oxidation stage. This residual $SO_2$ not only decreases the overall sulphur recovery efficiency, because it is not converted to elemental sulphur, but also decreases the activity of the selective oxidation catalyst.

To overcome this decrease of activity, the temperature level in the dry-bed oxidation reactor has to be increased, but a higher temperature level will decrease the oxidation efficiency to elemental sulphur. Consequently, very high oxidation efficiencies in the dry-bed oxidation stage, in the range of 94–96%, are not possible with process gas containing concentrations of $SO_2$ of more than about 250 ppmv.

It is one of the advantages of the present invention, that it allows the Claus process to be operated with a residual concentration of $SO_2$ which would otherwise be prohibitive for a downstream dry bed oxidation process.

The effect of a deactivated Claus catalyst, which results in an increased amount of $SO_2$ in the gas coming from the Claus unit, has the same negative effects on the overall sulphur recovery efficiency in case of a final dry-bed oxidation stage, because the $SO_2$ is not converted in the drybed oxidation stage.

Incorporation of a hydrogenation step, as in the present invention, makes the process not sensitive anymore to Claus catalyst deactivation, which is a major advantage. In this way the reduction step also acts as a safeguard and serves to maintain a constant and high sulphur recovery.

The control of the process with an incorporated hydrogenation step will also be much more flexible. A varying $SO_2$ content in the process gas from the last catalytic Claus reactor will not result in varying losses by $SO_2$ slippage, because all $SO_2$ is converted. This makes the control on $H_2S$ much less sensitive to process fluctuations.

According to a further embodiment the process comprises an additional step of selectively oxidising the hydrogen sulphide in the product gas of step iii) to elemental sulphur.

In this way of operation of the process it is not necessary to modify the ratio of $H_2S$ to $SO_2$, as in some of the prior art processes. Accordingly the ratio may be kept at levels close to the Claus equilibrium level of 2:1. A suitable range for this is from 10:1 to 1:2.

In detail the process of the invention can be described as comprising:

i) oxidising part of the hydrogen sulphide in a gaseous stream with oxygen or an oxygen containing gas in an oxidation stage to sulphur dioxide;

ii) reacting the product gas of this oxidation stage in at least two catalytic stages, in accordance with the Claus equation:

$$2\ H_2S+SO_2 \leftrightharpoons 2\ H_2O+3/n\ S_n$$

iii) catalytically reducing $SO_2$ in the gas leaving the last of said at least two catalytic stages, preferably employing for this purpose a reduction catalyst or a catalytic stage including a reduction catalyst which is effective to promote reduction of $SO_2$ iv) selectively oxidising $H_2S$ in the gas leaving the hydrogenation to elemental sulphur, preferably employing for this purpose a catalytic stage including a selective oxidation catalyst which is substantially insensitive to the presence of water vapour in the gas stream, is ineffective in promoting establishment of the equilibrium $$2\ H_2S+SO_2 \rightleftharpoons 2\ H_2O+3/n\ S_n, \text{ and}$$

is effective to promote oxidation of HS to sulphur in the presence of water vapour.

It is preferred in said step iv) of selectively oxidising $H_2S$ also employing a stoichiometric excess of oxygen sufficient to result in an overall excess of oxygen being employed in the total process for the recovery of sulphur from the hydrogen sulphide-containing gas.

In the process according to the present invention, the concentration of the hydrogen sulphide gas in the residual gas can be controlled in a simple way. Thus, for example, the signal from an $H_2S$ analyser in the residual gas can be used to set or adjust the amount of combustion air or oxidation air supplied to the oxidation stage.

The reduction step can be incorporated in a commercial process in several ways. The most economic way is to install a layer of hydrogenation catalyst below a layer of Claus catalyst, in the last catalytic Claus reactor, usually the second or third Claus reactor. The process conditions should fit for the hydrogenation conditions, such as temperature, sulphur dewpoint margin, sufficient hydrogen available. Usually this will be the case.

In another embodiment, the hydrogenation step is carried out in a separate (small) hydrogenation reactor, with or without prior removal of elemental sulphur from the gas to be hydrogenated.

Especially in case the gas contains substantial amounts of CO, it is advantageous to carry out the reduction under conditions that most of the sulphur vapour has been removed. In the presence of a hydrogenation (reduction) catalyst, CO and sulphur react, thereby producing unwanted by-products, such as COS, resulting in a decrease of sulphur recovery. In these cases it is preferred that the gas coming from the last Claus reactor is first subjected to a sulphur condensation step, with removal of condensed sulphur, followed by the reduction step of the present invention, optionally after reheating.

After the reduction step the gas is then further treated, such as in an oxidation stage to convert $H_2S$ to elemental sulphur.

An alternative process route, without a final dry-bed oxidation stage, may be attractive, with lower investment costs and somewhat lower sulphur recovery efficiency. This process alternative consists of a Claus converter with an oxidation stage and at least two catalytic Claus stages, the $H_2S$ concentration in the gas leaving the last of said at least two catalytic stages being controlled to have a value ranging between 0.1 and 0.4% by volume by increasing the quantity of combustion or oxidation air passed to the oxidation stage followed by reducing $SO_2$ in the gas leaving the last of said at least two catalytic stages in a hydrogenation step.

Depending on the number of catalytic Claus stages, a recovery efficiency of 98.0–99.5% can be reached.

In the context of this application, the term 'catalytic Claus stage' refers to the actual reactor containing the Claus catalyst. Depending on the plant set-up, the usual additional equipment may be present, such as reheaters or sulphur condensers.

The hydrogenation can also be applied down-stream of the dry-bed oxidation stage (SUPERCLAUS™ reactor), to convert the formed $SO_2$. This will increase the overall performance of the SUPERCLAUS™ process significantly.

In order to unload tail gas treating units such as SCOT, it is beneficial to install a hydrogenation stage down-stream of the last Claus catalytic stage. This will reduce the amount of sulphur components to be hydrogenated in the SCOT unit significantly, and will reduce solvent circulation and stripping-steam requirements.

The process according to the invention can be suitably applied for the treatment of gases containing hydrogen sulphide, but also for gases containing both hydrogen sulphide and substantial quantities of ammonia (cf NL-C 176160), in the latter case, the temperature in the Claus combustion chamber should be at least 1250° C.

A disadvantage of operating with excess $H_2S$ compared to $SO_2$ in the Claus tail gas is, that this operation mode results in less combustion air to the main ($H_2S$) burner compared to the conventional mode of operation with $H_2S:SO_2=2:1$. This will result in a decrease of temperature of combustion in the combustion chamber, which is detrimental to the destruction efficiency of ammonia, which requires high temperatures.

In the process according to the invention, the hydrogen sulphide gas remaining in the residual gas can be processed to form sulphur by a known per se method. Such methods are described in the literature. Preferably, however, the remaining gaseous hydrogen sulphide is oxidized with air in an oxidation stage to form elemental sulphur in accordance with the following reaction:

$$2\ H_2S+O_2 \rightarrow 2\ H_2O+2/n\ S_n \qquad (3)$$

It was found that, when the concentration of the hydrogen sulphide leaving the last catalytic hydrogenation stage is maintained at a value of between 0.5 and 1.2% by volume, after this selective oxidation, an optimum sulphur recovery percentage of 99.6–99.8 can be obtained. The oxidation can in principle take place in two ways, namely, by dry-bed oxidation or by oxidation in a liquid, in which, in general, sulphur and water vapour have first been removed from the residual gas.

In the dry-bed oxidation, the $H_2S$ concentration in the residual gas is preferably maintained between 0.5 and 1.2 by volume, because above 1.2% by volume of $H_2S$ the total sulphur recovery percentage is decreased.

In the dry oxidation bed, the oxidation to sulphur can be effected by a known per se method using an oxidation catalyst. One example of an oxidation catalyst and the application thereof is described in U.S. Pat. No. 4,311,683.

The method described therein is the SELECTOX process (Hass, R. H.; Ingalis, M. N.; Trinker, T. A.; Goar, B. G.; Purgason, R. S. S.: "Process meets sulphur recovery needs", Hydrocarbon Processing, May 1981, pages 104–107). In this process, $H_2S$ is oxidised to 5 and $SO_2$ using a special catalyst. Approximately 80% of the $H_2S$ supplied is oxidised to elemental sulphur, if water vapour is removed to a substantial extent. Another application of a dry-bed process which is not sensitive to water vapour in the process gas is the absorption of $H_2S$ in an absorption mass as described, the example, in European patent no. 71983.

In accordance with a particularly preferred embodiment of the process according to the present invention, the oxidation is carried out in a dry bed, using a catalyst, such as described in U.S. Pat. Nos. 4,818,740 and 5,286,697 or in WO-A 9732813, the contents of which is incorporated herein by way of reference.

The use of these catalysts for the oxidation in a dry bed of the hydrogen sulphide containing residual gases obtained using the process according to the present invention has the important, in particular economic advantage that such a catalyst is practically insensitive to the presence of water vapour in the residual gas, so that the removal of sulphur and water vapour from this residual gas is unnecessary, unless it is required for other reasons, such as described herein before.

The minimum volume percent of $H_2S$, corresponding with the maximum volume percent of $SO_2$, in the residual gas from the last Claus stage, is determined by the ratio $H_2/SO_2$ in the gas, which should be higher than two for acceptable $SO_2$ hydrogenation. For this reason, the $H_2S$ volume cannot be lowered too much. Also, when the $H_2S$ volume percentage to the dry-bed oxidation reactor is too low, the oxidation efficiency to sulphur in the dry-bed oxidation reactor is not at its maximum.

When the $H_2S$ volume percentage is too high, the overall recovery efficiency will also decrease. For above reasons, the optimum $H_2S$ volume percentage in the process gas from the hydrogenation stage, is preferably in the range of 0.5–1.2 Vol.%.

The liquid oxidation, too, can take place using a known process. Examples of known processes are the STRETFORD process (the Chemical Engineer, February 1984, pages 84 ff), the LO-CAT process of Air Resources Inc. or the TAKAHAX process.

The control of the oxidation air to the selective oxidation is not critical and can thus be kept simple.

The process according to the invention can be carried out in an existing Claus plant and requires only relatively simple modifications of the existing control of the gas streams. In case a 2 stage Claus plant including a hydrogenation step is used, a selective oxidation reactor will have to be provided in this specific embodiment of the present invention, which in relation to the cost involved in other residual gas processing plants is inexpensive. Thus the application of the process according to the present invention leads to considerable economic advantages.

In case a 3 stage Claus plant is used only the third catalytic reactor needs to be arranged as a selective oxidation reactor and the second Claus reactor has to be provided with a layer of a reduction catalyst. In this case, too therefore, a considerable economic benefit is obtained.

The elemental sulphur that is produced in the system can be condensed from the gas flows using conventional systems, such as condensers. In case an especially high sulphur recovery is necessary it may be advantageous to use the system disclosed in EP-A 655,414, more in particular for the treatment of the final product gas flow, after the last treatment.

The process according to the present invention will now be described in more detail with reference to the accompanying FIGS. 1, 2 and 3.

As shown in FIG. 1, the feedstock gas (=Claus gas) is supplied through line 1 to the Claus burner with combustion chamber 2. The amount of combustion air, controlled by the quantity-proportion regulator 3 and H,S analyser 23, is supplied to Claus burner 2 through line 4. The heat generated during the combustion (1200° C.) of the Claus gas is dissipated in a boiler heated by spent gases, producing steam that is discharged through line 6.

The Claus reaction takes place in the burner and the combustion chamber. The sulphur formed is condensed in boiler 5 (150° C.) and discharged through line 7. The gas is passed through line 8 to a heater 9 where it is heated to the desired reaction temperature of 250° C. before being supplied through line 10 to the first Claus reactor 11. In reactor 11 the Claus reaction takes place again, whereby sulphur is formed. The gas is discharged through line 12 to the sulphur condenser 13. The condensed sulphur (150° C.) is discharged through line 14. Thereafter the gas is passed through line 15 to the next reactor stage, which again includes a heater 16, a reactor 17 and a sulphur condenser 18. In this reactor the Claus reaction takes place again in the top-part of the reactor on Claus catalyst layer 32. In the bottom part a layer 33 of a reduction catalyst is installed, where the residual $SO_2$ is hydrogenated. The condensed sulphur (150° C.) is discharged through line 19. The steam generated in the sulphur condensers is discharged through lines 20 and 21.

The $H_2S$ concentration in the residual gas line 22 is controlled by an $H_2S$ analyser 23 to a range of from 0.5–1.2% by volume. The $H_2S$ analyser controls a control valve in combustion air line 24.

The residual gas is passed through line 22 to the sulphur removing stage 26. This sulphur removing stage may be a known sulphur removing process, such as, for example, a dry-bed oxidation stage, an absorption stage or a liquid oxidation stage. The air required for the oxidation is supplied through line 27. The sulphur formed is discharged through line 28.

The gas is then passed through line 29 to an afterburner 30 before being discharged through chimney 31.

Figure 2:
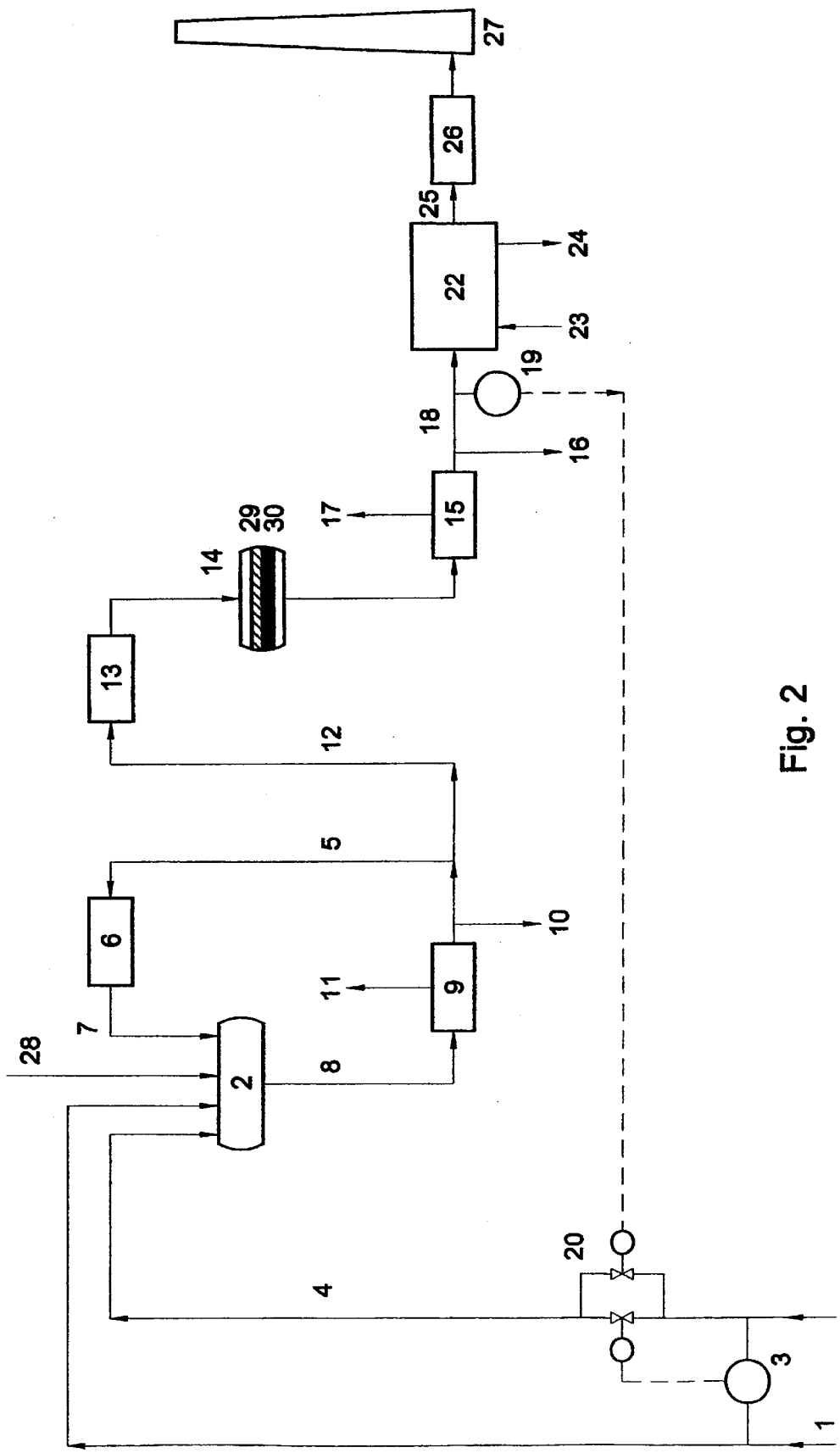
FIG. 2 is a schematic diagram of lean feedstock Claus gas process of the invention.

As shown in FIG. 2, a lean Claus feedstock gas is supplied through line 1 to an oxidation reactor 2. An amount of oxidation air controlled by the quantity ratio regulator 3 and $H_2S$ analyser 19 is passed to the oxidation reactor through line 4. In the oxidation reactor a portion of the $H_2S$ is oxidised over a special catalyst to form $SO_2$ whereafter the Claus reaction takes place.

To prevent an unduly high temperature from arising within the oxidation reactor, as a result of the reaction heat, a quantity of gas is recycled by means of blower 6 through lines 5 and 7. The gas from reactor 2 is passed through line 8 to sulphur condenser 9, where the sulphur formed during the reaction is condensed at 150° C. and discharged through line 10. The heat generated during the reaction is dissipated in sulphur condenser 9 with generation of steam, which is discharged through line 11. The gas is passed through line 12 to a heater 13, where it is heated, for example, to 220° C. before being supplied to the Claus reactor 14. In reactor 14, the Claus reaction takes place again in catalyst layer 29 in the top part of the reactor. In the bottom part of reactor 14, $SO_2$ in the process gas is hydrogenated by layer 30 consisting of a reduction catalyst. In condenser 15, the sulphur is condensed at 150° C. and discharged through line 16, and steam generated is discharged through line 17. The $H_2S$ concentration in the residual gas line 18 is controlled by an $H_2S$ analyser 19 to a range of from 0.5–1.2% by volume. The $H_2S$ analyser controls a control valve in the combustion air line 20.

The residual gas is passed through line 18 to the sulphur removing stage 22. The air required for the oxidation is supplied through line 23. The sulphur formed is discharged through line 24. The gas is then passed through line 25 to an after-burner 26 before being discharged through chimney 27.

FIG. 3 shows in greater detail the oxidation or absorption in a dry bed and the oxidation in a liquid as indicated more generally in 26 of FIG. 1 or 22 of FIG. 2. In FIGS. 1 and 2, the residual gas is supplied through lines 22 and 18, respectively, in FIG. 3, the residual gas is supplied through line 1.

Figure 3A:
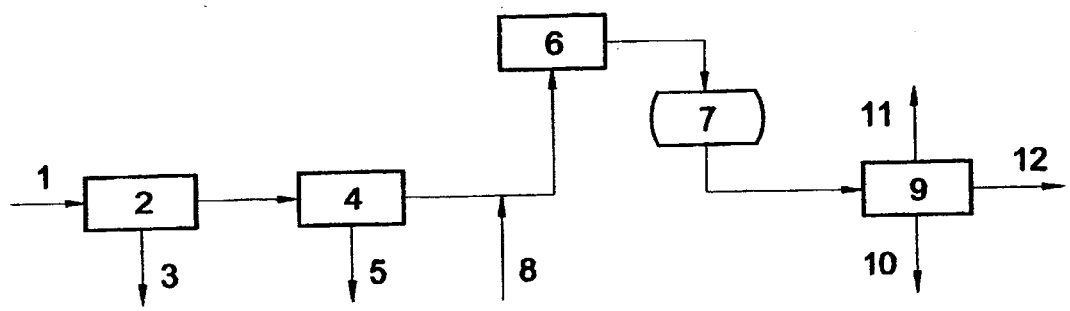
FIG. 3 is a scheratic diagram of the oxidation or absorption process in a dry bed and the oxidation in a liquid in detail during the sulfur removal stage after the residual gas is supplied.

In FIG. 3a, after the removal of the sulphur from the residual gas in separator 2, which is discharged through line 3, and the condensation of the water in 4, which is discharged through line 5, the gas is supplied through a heater 6 to an oxidation reactor 7. The removal of sulphur and water in 2 and 4 respectively, can take place using a known method, for example, as disclosed in U.S. Pat. No 4,526,590. In the oxidation reactor 7, a catalyst may be provided, for example, as described in the French patent publications 8009126, 8105029 or 8301426. The required oxidation air is supplied through line 8.

From the reactor, the gas flows to a sulphur condenser 9. The sulphur condensed is discharged through line 10, and the steam generated through line 11. The gas next flows through line 12 to the after-burner as designated by 30 in FIG. 1 and 26 in FIG. 2.

Figure 3B:
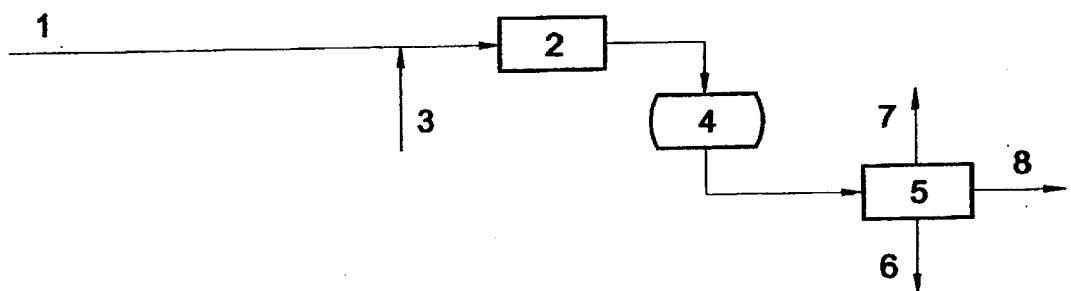

As shown in FIG. 3b, the residual gas is supplied through line 1 and heater 2 direct to the oxidation stage, that is to say, without a preceding sulphur and water removing stage. This embodiment can be used when a catalyst is present in the oxidation reactor 4, as described above, consisting of a non-Claus active carrier to which at least 0.1% by weight of a catalytically active material, in particular a metal oxide, has been applied, so that the specific area of the catalyst is more than 20 m$^2$/g, while the average pore radius is at least 25 Å. The oxidation air required is supplied through line 3. The sulphur condensed in sulphur condenser 5 is discharged through line 6 and the steam generated through line 7. The gas next flows through line 8 to the after burner designated by 30,in FIG. 1, and by 26 in FIG. 2.

Figure 3C:
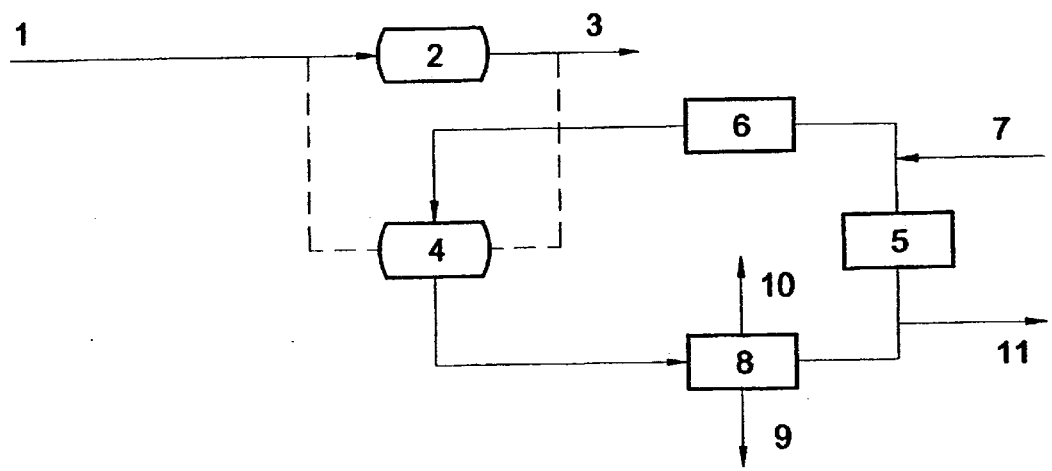

As shown in FIG. 3c the residual gas is passed through line 1 to a reactor 2 filled with an absorption mass, for example, as described in European patent no. 71983. In reactor 2, the hydrogen sulphide is removed from the residual gas by absorption. The gas next flows through line 3 to the afterburner, designated by 30 in FIG. 1 and by 26 in FIG. 2. When the bed is saturated, it is regenerated. Reactor 4 is connected in parallel to reactor 2 and is regenerated. By means of a circulation blower 5, a quantity of gas is circulated. This gas is heated in heater 6. The air required for the oxidation is supplied through line 7. The gas flows from reactor 4 to sulphur condenser 8. The sulphur condensed is discharged through line 9 and the steam generated through line 10. To keep the system at the required pressure a small gas stream is discharged through line 11 and recycled to the feedstock for the Claus plant (line 1 in FIGS. 1 and 2).

Figure 3D:
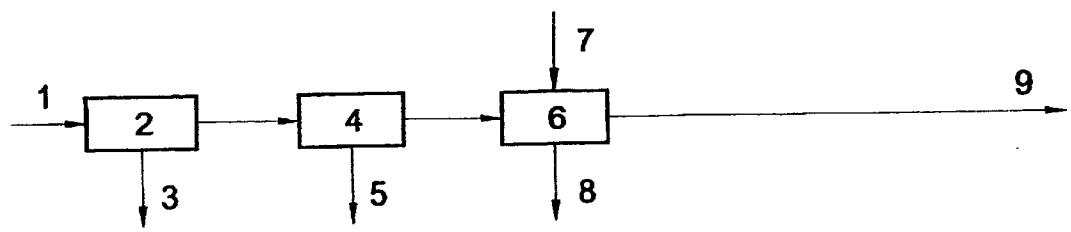

As shown in FIG. 3d, sulphur is removed in separator 2, which is discharged through line 3. Subsequently, in condenser 4, water is condensed which is removed through line 5. The gas is passed to a liquid oxidation stages 6. The oxidation stage may contain, for example, a basic solution of sodium carbonate, ADA (anthraquinone disulphonic acid) and sodium metavanadate, as used in the well-known STRETFORD process.

Figure 4:
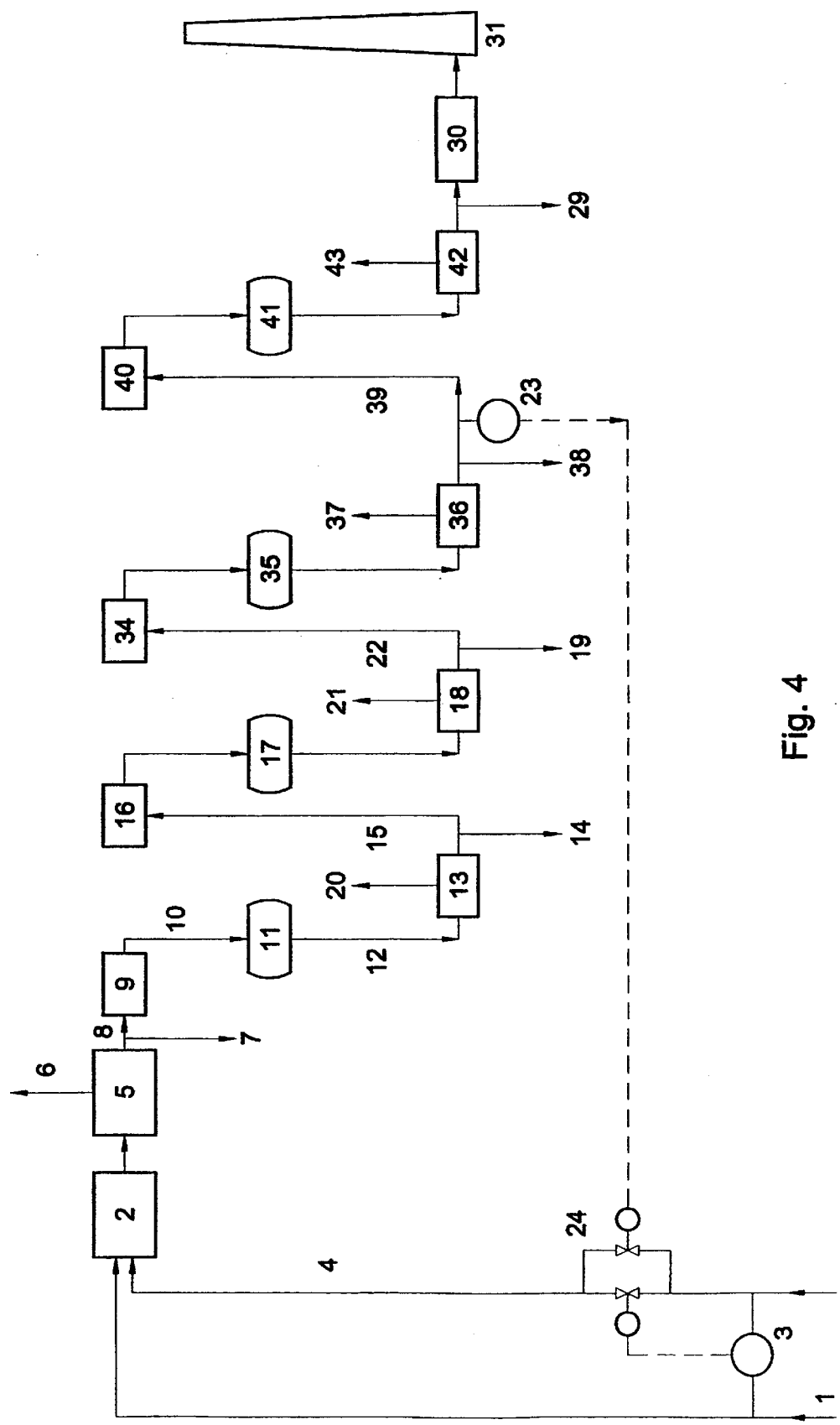
FIG. 4 is a schematic diagram of another feedstock Claus gas process, similar to FIG. 1, but includes a separate hydrogenation stage.

$H_2S$ is absorbed in the liquid and subsequently oxidised with air. The oxidation air is supplied through line 7 and the sulphur formed is discharged through line 8. The gas next flows through line 9 to the after-burner (30 in FIG. 1 and 26 in FIG. 2). FIG. 4 shows an installation which is similar to that of FIG. 1, with the exception of the drybed oxidation stage, and including a separate hydrogenation stage. Starting with the third catalytic Claus stage comprising reheater 34, reactor 35 and sulphur condenser 36, the process gas is routed via line 39 to reheater 40. Reactor 41 contains a catalyst active for the hydrogenation of $SO_2$. Analyser 23 in line 39 controls the content of $H_2S$ in the process gas.

The invention is illustrated in and by the following examples.

EXAMPLE 1

Using the apparatus as described with reference to FIGS. 1 and 3a, the Claus reaction is performed in a Claus plant having two catalytic Claus stages and a hydrogenation stage. Supplied to the thermal stage are a Claus gas, containing 90% by volume of $H_2S$, corresponding to 90 kmoles/h, 4% Vol. $CO_2$, 5 Vol. $H_2O$ and 1% Vol. $C_2H_6$, and 48.5 kmoles/h $O_2$ (a "deficit" of 0%) as air oxygen. The $H_2S$ volume percentage in the residual gas after the catalytic hydrogenation stage is 0.6, and the $SO_2$ content therein negligible. After the removal of sulphur and water and using a dry-bed process for the oxidation of $H_2S$ with an oxidation efficiency of 80%, a total sulphur recovery percentage of 99.5 is obtained.

EXAMPLE 2

Using the apparatus as described with reference to FIGS. 1 and 3b, the Claus reaction is performed in a Claus plant having two catalytic stages and a hydrogenation stage. Supplied to the thermal stage are a Claus gas containing 90% by volume of $H_2S$ corresponding to 90 kmoles/h, 4% by volume of $CO_2$, 5% by volume of $H_2O$ and 1% by volume of $C_2H_6$, and 48.5 kmoles/h of $O_2$ (a "deficit" of 0%) as air oxygen. The $H_2S$ volume percentage in the residual gas after the catalytic hydrogenation stage is 0.57, the $SO_2$ content therein is immeasurably small, and its water content is 34.3 by volume. The dry-bed oxidation is carried out using a water insensitive oxidation catalyst, comprising a silica carrier (Degussa OX-50, specific area 42 m$^2$/g) to which 5 by weight of $Fe_2O_3$, and 0.5% by weight of $P_2O_5$ have been applied as catalytically active material, which, after pelletisation and calcination has a BET area of 40.1 m$^2$/g, with an average pore radius of 350 Å. Using this catalyst with an oxidation efficiency of 94%, a total sulphur recovery percentage of 99.7 is obtained.

What is claimed is:

1. A process for the recovery of sulphur from a hydrogen sulphide containing gas, which process comprises:
   i) oxidising part of the hydrogen sulphide in a gaseous stream with oxygen or an oxygen containing gas in an oxidation stage to sulphur dioxide;
   ii) reacting the product gas of this oxidation stage in at least two catalytic stages, in accordance with the Claus equation:

$$2\ H_2S + SO_2 \rightarrow 2\ H_2O + 3/n\ S_n$$

iii) catalytically reducing $SO_3$ in the gas leaving the last of said at least two catalytic stages, wherein the catalytic reduction takes place in a hydrogenation catalyst placed downstream within the last Claus catalytic stage, thereby producing a gas mixture comprising less than 1.2 vol. % of $H_2S$; and
   iv) selectively oxidising $H_2S$ in the gas obtained in step iii) to elemental sulphur in a dry oxidation bed and removing elemental sulphur from the product gas of this stage.

2. Process according to claim 1, wherein the process conditions in steps i) and ii) are such, that the molar ratio of $H_2S$ to $SO_2$ is between 10:1 and 1:2.

3. A process as claimed in claim 2, wherein an H$_2$S concentration of 0.5–1.2% by volume is selected in the gas coming from the catalytic reduction stage iii).

4. Process according to claim 2, wherein the hydrogenation catalyst is a compound containing a metal selected from group VI and VIII of the periodic table of elements.

5. Process according to claim 2, wherein the hydrogenation is carried out at a temperature not exceeding 250° C.

6. Process according to claim 2, wherein the hydrogenation catalyst has a cobalt-molybdenum compound.

7. Process according to claim 2, wherein the hydrogenation catalyst has a cobalt-molybdenum compound.

8. A process as claimed in claim 1, wherein an H$_2$S concentration of 0.5–1.2% by volume is selected in the gas coming from the catalytic reduction stage iii).

9. Process according to claim 8, wherein the hydrogenation catalyst is a compound containing a metal selected from group VI and VIII of the periodic table of elements.

10. Process according to claim 8, wherein the hydrogenation is carried out at a temperature not exceeding 250° C.

11. Process according to claim 8, wherein the hydrogenation catalyst has a cobalt-molybdenum compound.

12. Process according to claim 8, wherein the hydrogenation catalyst has a nickel-molybdenum compound.

13. Process according to claim 1, wherein the hydrogenation catalyst is a compound containing a metal selected from group VI and VIII of the periodic table of elements.

14. Process according to claim 13, wherein the hydrogenation is carried out at a temperature not exceeding 250° C.

15. Process according to claim 1, wherein the hydrogenation is carried out at a temperature not exceeding 250° C.

16. Process according to claim 1, wherein the hydrogenation catalyst has a cobalt-molybdenum compound.

17. Process according to claim 1, wherein the hydrogenation catalyst has a nickel-molybdenum compound.

* * * * *

UNITED STATES PATENT AND TRADEMARK OFFICE
CERTIFICATE OF CORRECTION

PATENT NO. : 6,652,827 B1
DATED : November 25, 2003
INVENTOR(S) : Johannes Borsboom et al.

It is certified that error appears in the above-identified patent and that said Letters Patent is hereby corrected as shown below:

<u>Title page,</u>
Item [73], Assignee, "Jacobs Nederland B.V., CB Leiden (NL)" should read
-- GASTEC N.V., Wilmersdorf (NL) and Jacobs Nederland B.V., CB Leiden (NL) --.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,652,827 B1
DATED : November 25, 2003
INVENTOR(S) : Johannes Borsboom et al It is certified that error appears in the above-identified patent and that said Letters Patent is hereby corrected as shown below:

Column 5,
Line 24, "scheratic" should read -- schematic --;

Column 11,
Line 55, "stages" should read -- stage --;

Column 12,
Line 55, "$SO_3$" should read -- $SO_2$ --; and

Column 13,
Line 12, "cobalt-molybdenum" should read -- nickel-molybdenum --.

Signed and Sealed this

Twenty-sixth Day of July, 2005

JON W. DUDAS
*Director of the United States Patent and Trademark Office*